United States Patent
Schur et al.

(10) Patent No.: US 11,969,804 B2
(45) Date of Patent: Apr. 30, 2024

(54) DEEP-HOLE DRILL HAVING A PLURALITY OF CHIP-FORMING DEVICES AND RECESSES IN THE RAKE FACE

(71) Applicant: botek Präzisionsbohrtechnik GmbH, Riederich (DE)

(72) Inventors: Gotthold Schur, Neuffen (DE); Jürgen Deeg, Metzingen (DE)

(73) Assignee: botek Präzisionsbohrtechnik GmbH, Riederich (DE)

( * ) Notice: Subject to any disclaimer, the term of this patent is extended or adjusted under 35 U.S.C. 154(b) by 0 days.

(21) Appl. No.: 16/973,503

(22) PCT Filed: Mar. 21, 2019

(86) PCT No.: PCT/EP2019/057071
§ 371 (c)(1),
(2) Date: Dec. 9, 2020

(87) PCT Pub. No.: WO2019/238288
PCT Pub. Date: Dec. 19, 2019

(65) Prior Publication Data
US 2021/0245268 A1    Aug. 12, 2021

(30) Foreign Application Priority Data
Jun. 13, 2018  (DE) .................... 10 2018 114 138.6

(51) Int. Cl.
*B23B 51/06*    (2006.01)
*B23K 26/362*   (2014.01)

(52) U.S. Cl.
CPC .......... *B23B 51/066* (2022.01); *B23B 51/063* (2022.01); *B23B 2251/248* (2013.01);
(Continued)

(58) Field of Classification Search
CPC ..... B23B 51/00; B23B 51/063; B23B 51/066; B23B 2251/085; B23B 2251/424; B23B 2251/48; B23B 2251/248; B23B 2251/56
See application file for complete search history.

(56) References Cited

U.S. PATENT DOCUMENTS

| 85,107 A | * | 12/1868 | Le | B23B 51/108 |
| | | | | 408/229 |
| 2,322,894 A | * | 6/1943 | Stevens | B23B 51/02 |
| | | | | 408/230 |

(Continued)

FOREIGN PATENT DOCUMENTS

| DE | 04413932 | 1/1996 |
| DE | 10316116 A1 | 10/2004 |

(Continued)

OTHER PUBLICATIONS

Espacenet internet translation of DE-102010051248-A1, translated Aug. 4, 2022.*

(Continued)

*Primary Examiner* — Eric A. Gates
(74) *Attorney, Agent, or Firm* — George R. McGuire (57) ABSTRACT

The invention relates to a single-lip drill and a double-lip drill having a plurality of chip-forming devices or depressions in the rake face which are arranged in succession and at a distance from one another. As soon as a cutting edge and/or the associated chip-forming device or the associated depression is worn, the deep hole drill according to the invention can be reground using simple means.

6 Claims, 11 Drawing Sheets

(52) U.S. Cl.
CPC ....... *B23B 2251/48* (2013.01); *B23B 2251/56* (2013.01); *B23K 26/362* (2013.01)

(56) References Cited

U.S. PATENT DOCUMENTS

| | | | | |
|---|---|---|---|---|
| 4,802,799 | A * | 2/1989 | Rachev | B23B 51/02 407/62 |
| 5,160,232 | A * | 11/1992 | Maier | B23B 51/02 407/54 |
| 5,443,585 | A | 8/1995 | Kawase et al. | |
| 5,509,761 | A * | 4/1996 | Grossman | B23B 51/0493 408/230 |
| 5,873,683 | A * | 2/1999 | Krenzer | B23B 51/00 408/230 |
| 6,030,155 | A | 2/2000 | Scheer et al. | |
| 9,028,179 | B2 * | 5/2015 | Wada | B23B 51/00 408/230 |
| 10,661,362 | B2 * | 5/2020 | Boulakhov | B23C 5/10 |
| 2007/0041801 | A1 | 2/2007 | Randecker et al. | |
| 2013/0200400 | A1 | 8/2013 | Jang | |
| 2015/0217383 | A1 * | 8/2015 | Wenzelburger | B23B 51/0486 408/199 |

FOREIGN PATENT DOCUMENTS

| | | | |
|---|---|---|---|
| DE | 102008010833 A1 | 8/2009 | |
| DE | 202009012569 U1 * | 2/2010 | ............. B23B 51/06 |
| DE | 102010051248 A1 * | 6/2011 | ......... B23B 51/0486 |
| DE | 102012106660 A1 | 8/2013 | |
| FR | 973672 A * | 2/1951 | |
| JP | H825120 A | 1/1996 | |
| JP | 2007050477 A * | 3/2007 | |
| WO | 2004087356 A1 | 10/2004 | |

OTHER PUBLICATIONS

English Translation of JP-2007050477-A, Mar. 2007.*
English Translation of DE-202009012569-U1, Feb. 2010.*
International Search Report and Non-Translated Written Opinion Form PCT/IS/210 and PCT/ISA/237, International Application No. PCT/EP2019/057071 pp. 1-9 International Filing Date Mar. 21, 2019, mailing date of search report dated Jun. 24, 2019.
Canadian Correspondence dated Jun. 25, 2021, pp. 1-5.

* cited by examiner

View A

DEEP-HOLE DRILL HAVING A PLURALITY OF CHIP-FORMING DEVICES AND RECESSES IN THE RAKE FACE

CROSS REFERENCE TO RELATED APPLICATIONS

The present application is the U.S. National Stage application of International Application No. PCT/EP2019/057071, filed Mar. 21, 2019, and relates and claims priority to German patent application No. 102018114138.6, filed on Jun. 13, 2018, the entire content of each of which is incorporated herein by reference.

BACKGROUND OF THE INVENTION

The invention relates to a deep hole drill comprising chip-forming devices and/or depressions in the rake face arranged one behind the other in the longitudinal direction of the tool, characterized in that it can simply be reground after reaching the end of its service life. The rake face of the drilling tools according to the invention is planar and not, as is the case e.g. with a twist drill, coiled.

The terms essential for the disclosure of the invention are explained, inter alia, in conjunction with the description of the figures. Furthermore, at the end of the description of the figures, individual terms are explained in the form of a glossary.

Deep hole drills which have a structure in the rake face that extends in the axial direction are known from DE 10 2012 106 660 A1, DE 44 13 932 A1 and JP 8025120 A. When regrinding the face, this structure is maintained and regrinding can be carried out on a simple grinding machine.

A single-lip drill which has a chip-forming device that extends parallel to the outer cutting edge is known from DE 103 16 116 A1. Such a chip-forming device starts at the outer diameter of the drill and extends over most of the outer cutting edge.

This design of a chip-forming device is likewise intended to lead to favorable formation of chips and thus allow faster machining. Such a chip-forming device is produced by grinding and must be very precise. For this purpose, computer numerically controlled (CNC) grinding machines are mainly used. Because the chip-forming device extends parallel to the outer cutting edge, when regrinding such a single-lip drill, the drill head must be ground down by an amount which corresponds at least to the width of the chip-forming device so that a new chip-forming device can be ground into the "untouched" rake face. The latter can usually only be carried out to the required accuracy by the manufacturer of the deep hole drill.

SUMMARY OF THE INVENTION

Problem Addressed by the Invention

The problem addressed by the invention is that of providing a deep hole drill (single-lip drill or double-lip drill) or another drilling tool which has a straight groove, a planar rake face and which is also suitable for machining tough and/or long-chipping materials. It should also be easy to regrind such that a user can regrind it on a simple grinding machine.

According to the invention, this problem is solved for a deep hole drill comprising a drill head which has one or two cutting edges, a flute being assigned to each cutting edge, each cutting edge having a rake face and the drill head having one or two secondary cutting edges, in that a plurality of chip-forming devices and/or a plurality of depressions are arranged in each rake face, parallel to the cutting edge and mutually spaced in the longitudinal direction of the drill.

The regrinding of the deep hole drill according to the invention consists in removing the drill tip until the worn cutting edge and the associated chip-forming device or the associated depression are completely removed. Then, together with the next chip-forming device already in the rake face or the next depression, a new cutting edge is formed which has the same geometry and usage properties as the cutting edge present when the deep hole drill was first delivered.

In terms of manufacturing technology, the introduction of the chip-forming devices and the depressions in the rake face is more demanding than grinding the drill tip. Therefore, according to the invention, a plurality of chip-forming devices or a plurality of depressions are introduced by the manufacturer of the deep hole drill. This ensures consistent quality. In addition, it is possible to coat the rake face and all chip-forming devices or depressions machined into the rake face at once.

Regrinding the deep hole drill according to the invention only affects the flank of the deep hole drill that has become blunt. The existing coating of the rake face and chip-forming devices or depressions is maintained. Therefore, the readjusted cutting edges have almost the same service life as the first cutting edge (usually having a coated flank) produced by the manufacturer. The deep hole drill according to the invention can be reground on site by the user using a simple grinding device by readjusting the tip until a chip-forming device or a depression has been removed. The same cutting edge geometry is then available again. Sending blunt deep hole drills to the manufacturer for regrinding is not necessary. This simplifies and speeds up regrinding enormously and saves considerable costs.

It has been found during drilling tests that the chips do not "catch" in the subsequent chip-forming devices, which are arranged offset in the axial direction, but are carried away via the rake face so that chips do not accumulate.

Extensive tests have shown that the risk of tool breakage by introducing a plurality of chip-forming devices or depressions does not increase.

The concept according to the invention can naturally be implemented both for single-lip drills and for double-lip drills and other drilling tools having a planar rake face. In both types of deep hole drills, the rake face is planar and therefore easily accessible, such that the desired number of chip-forming devices or depressions can be introduced into the rake face using a grinding wheel, a grinding pin, erosion or laser ablation.

It is obvious that the invention is not limited to specific geometries of chip-forming devices or depressions. A chip-forming device or a depression according to the invention can have the shape of an isosceles or non-isosceles triangle in a plane which extends orthogonally to the cutting edge. They can also have the shape of a circular segment or some other curved shape in cross section. It is also possible for the chip-forming devices or the depressions to be composed of straight surfaces and/or surfaces which have been curved (once or multiple times).

In a further, advantageous embodiment of the invention, there is also a distance between one edge of the depressions and the secondary cutting edge. This means that the secondary cutting edge is not weakened by the depression. Furthermore this has a positive effect on the service life of the cutting corner, which results from the intersection of the outer cutting edge and the secondary cutting edge. The depressions according to the invention in the rake face do not weaken the cutting corner. This is particularly advantageous because the wear of a deep hole drill usually starts at the cutting corner. At the same time, the depressions improve chip formation and long-chipping materials can also be machined efficiently.

In a further, advantageous embodiment of the invention, two or more rows of chip-forming devices or depressions which extend parallel to one another are introduced into the rake face of the deep hole drill. This makes it possible to combine the advantages of both elements that influence chip formation (chip-forming devices and depressions).

The deep hole drill according to the invention can also be provided with a chip divider which divides the cutting edge into an inner portion and an outer portion. This reduces the width of the chips.

It has also proven to be advantageous if a row of chip-forming devices or depressions is assigned to the inner portion of the cutting edge. Correspondingly, a row of chip-forming devices or depressions can be assigned to the outer portion of the cutting edge. It is also possible that a row of depressions or a row of chip-forming devices is assigned to only one of the two cutting edges (not shown).

This results in further, very effective embodiments which greatly effect chip formation in a positive manner with relatively little effort for introducing the chip-forming devices or depressions.

In a further, advantageous embodiment of the invention, at least the drill head of the deep hole drill according to the invention is completely or partially provided with a wear protection layer, in particular a hard material coating, after the chip forming device or depressions have been introduced.

The advantages of the invention are also achieved by the method according to the invention.

Further details, features and advantages of the subject matter of the invention can be found in the dependent claims and in the following description of the associated drawings, in which a plurality of embodiments of the invention are shown by way of example.

It is obvious that the invention can be applied to the most varied of shapes and geometries of chip-forming devices and depressions. Therefore, the geometries of chip-forming devices and depressions shown in the figures do not limit the scope of protection of the claimed invention, but are mainly used for illustration.

DESCRIPTION OF THE EXEMPLARY EMBODIMENTS

Figure 1:
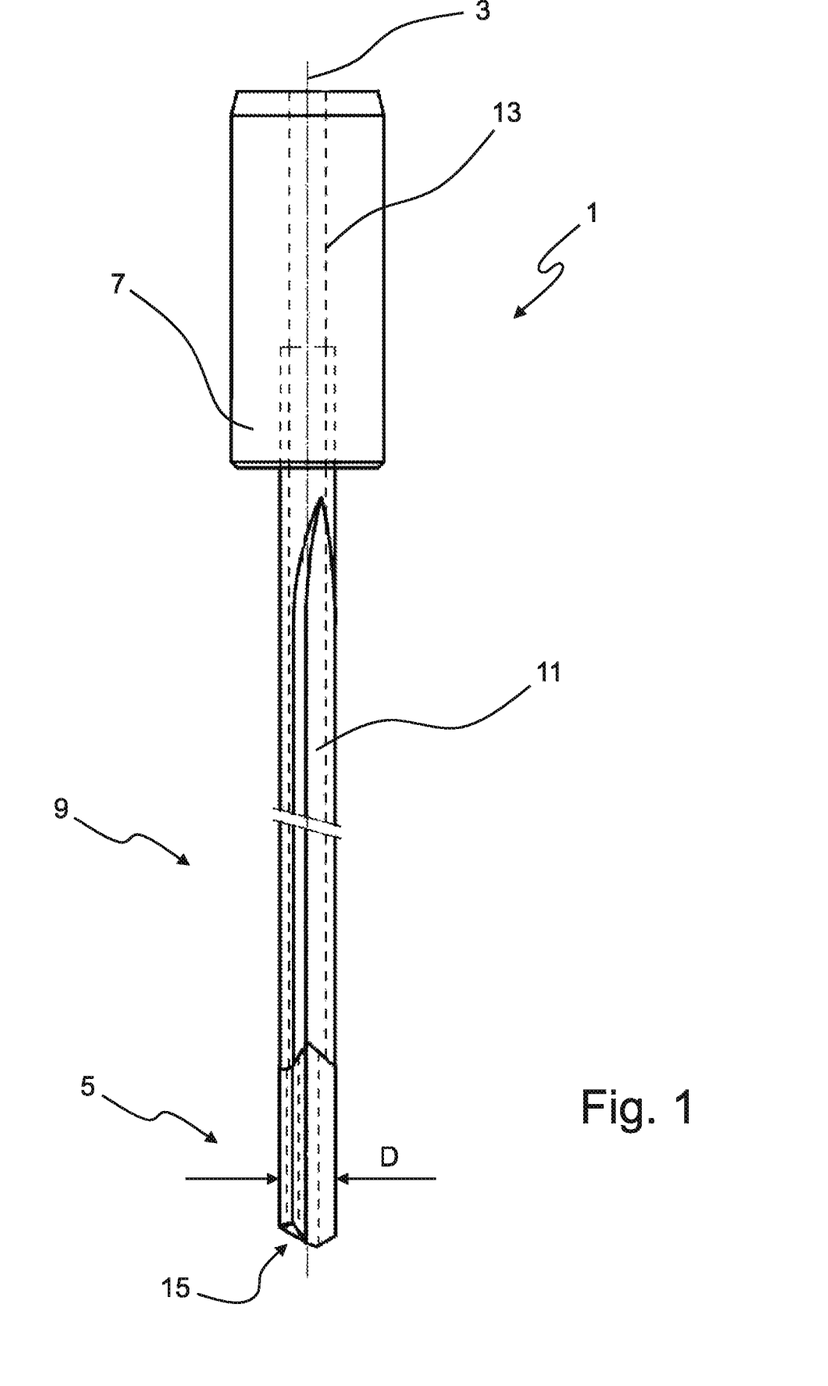
FIGS. 1 and 2 show a single-lip drill (prior art)

In all figures, the same reference signs are used for the same elements or components. FIG. 1 shows a single-lip drill provided in its entirety with the reference number 1. A central axis 3 is at the same time also the axis of rotation of the single-lip drill 1 or of the workpiece (not shown) when this is set in rotation during drilling.

A diameter of the single-lip drill 1 is denoted by D. The single-lip drill 1 is composed of three main components, specifically a drill head 5, a clamping sleeve 7 and a shank 9. Double-lip drills have the same structure and are therefore not shown separately. This structure is known to the person skilled in the art both from single-lip drills 1 and from double-lip drills (not shown) and is therefore not explained in detail.

In the shank 9 and the drill head 5 there is a longitudinal groove 11, which is also referred to as a bead. The longitudinal groove 11 has a cross section approximately in the form of a circular segment having an angle usually of approximately 90° to 130°. The longitudinal groove 11 extends from the tip of the drill up to in front of the clamping sleeve 7. Because of the longitudinal groove, the drill head 5 and shank 9 have a cross section approximately in the shape of a circular segment having an angle of usually 230° to 270° (a supplementary angle to the angle of the longitudinal groove).

A cooling channel 13 extends over the entire length of the single-lip drill 1. At one end of the clamping sleeve 7, coolant or a mixture of coolant and air is conveyed under pressure into the cooling channel 13. The coolant or the mixture of coolant and air flows out of the cooling channel 13 again at the opposite front end 15. The coolant has a plurality of functions. On the one hand, it cools and lubricates the cutting edge and the guide pads. In addition, it conveys the chips produced during drilling out of the borehole via the longitudinal groove 11.

Figure 2:
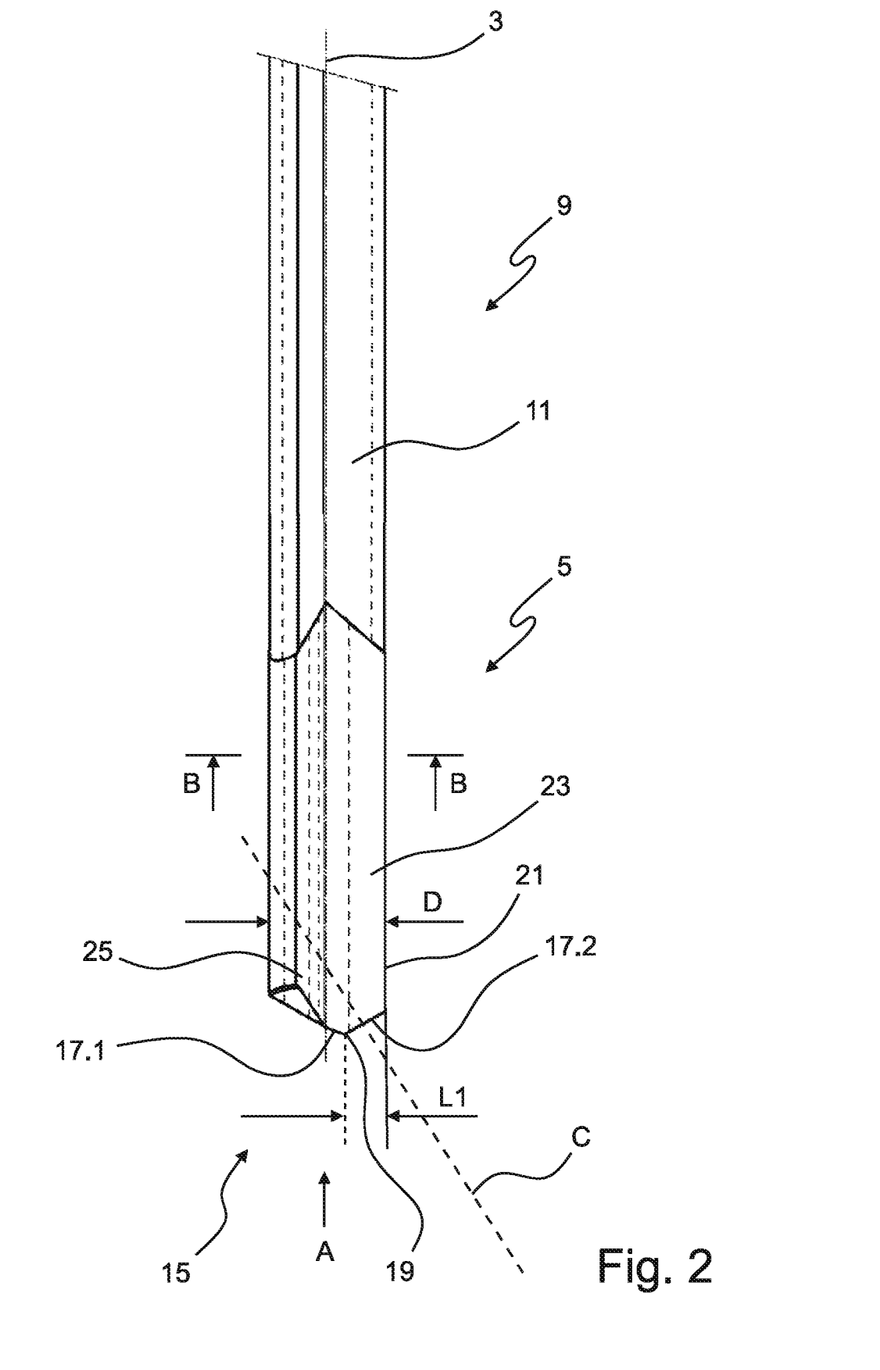

The front end 15 is shown somewhat enlarged in FIG. 2. Elements of the drill head 5 are explained in more detail on the basis of this figure.

In single-lip drills 1, a cutting edge 17 usually consists of an inner cutting edge 17.1 and an outer cutting edge 17.2. A cutting tip has the reference number 19. As is usual with single-lip drills, the cutting tip 19 is arranged at a radial distance from the central axis 3. The inner cutting edge 17.1 extends from the central axis 3 to the cutting tip 19. The outer cutting edge 17.2 extends from the cutting tip 19 in the radial direction to the outer diameter D of the drill head 5 and ends at a secondary cutting edge 21.

A distance between the cutting tip 19 and the secondary cutting edge 21 is denoted by L1 in FIG. 2. The (straight) longitudinal groove 11 is delimited by a planar rake face 23 and a planar wall 25. The rake face 23 and the wall 25 include an angle of approximately 130°. In the embodiment shown, the rake face 23 extends through the central axis 3. However, this does not have to be the case.

Figure 3:
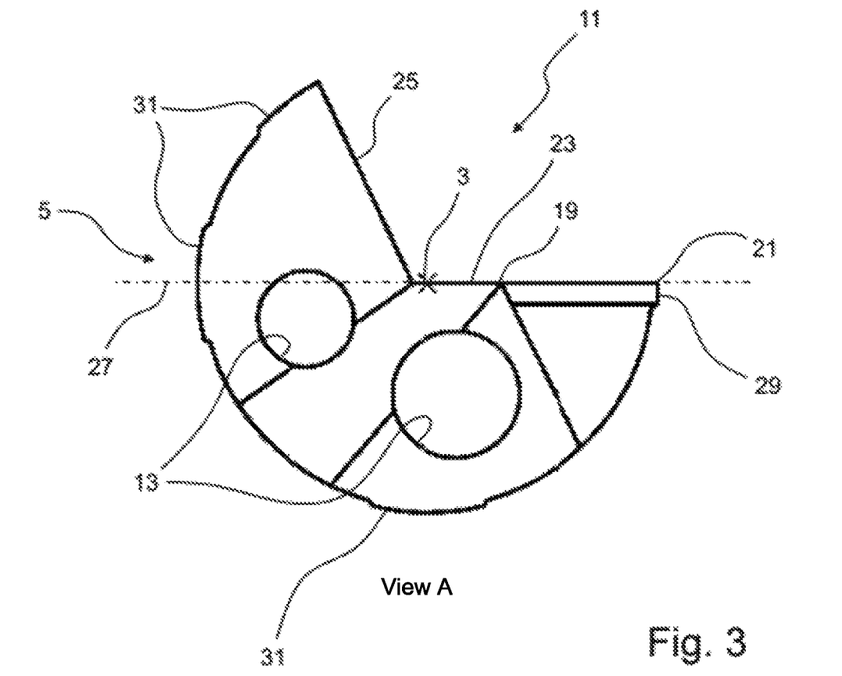
FIG. 3 shows a view from the front of the single-lip drill according to FIG. 1.

In FIG. 3, the central axis 3 is shown as "X." The straight (longitudinal) groove 11 is also clearly visible. It is defined by a rake face 23 and a wall 25. The rake face 23 and the wall 25 include an angle of approximately 130°. In the embodiment shown, the rake face 23 extends through the central axis 3. A rake face plane 27, indicated by a dot-dashed line, likewise extends through the central axis 3. The rake face plane 27 is a geometric definition which is not always visible on the single-lip drill. The rake face plane 27 is defined in that it extends parallel to the rake face 23 and through the central axis 3.

When the rake face 23 extends through the central axis 3, the rake face plane 27 and the rake face 23 coincide and the rake face plane 27 can be seen.

In FIG. 3, the inner cutting edge 17.1 can be seen as a line between the central axis 3 and the cutting tip 19. Correspondingly, the outer cutting edge 17.2 can be seen as a line between the cutting tip 19 and the secondary cutting edge 21. When viewed from the front, the inner cutting edge 17.1 and the outer cutting edge 17.2 coincide with the rake face 23. For the sake of clarity, reference signs 17.1 and 17.2 do not appear in FIG. 3.

A plurality of guide pads 29 and 31 are formed on the drill head 5, distributed over the circumference. The guide pad 29 and the rake face 23 form the secondary cutting edge 21 where they intersect. This guide pad is referred to below as a circular grinding chamfer 29. The circular grinding chamfer 29 and the guide pads 31 have the task of guiding the drill head 5 in the bore.

Figure 4:
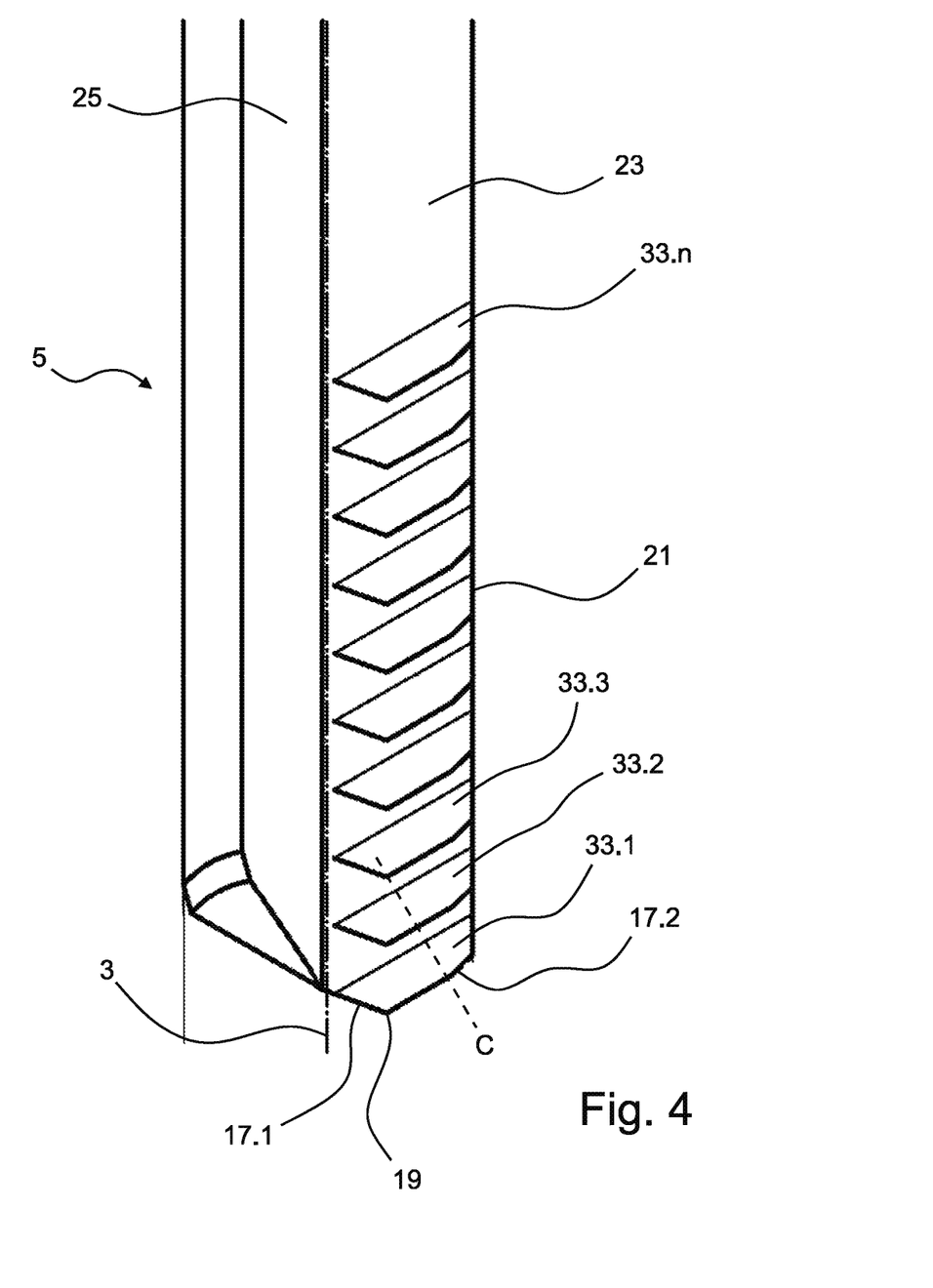
FIG. 4 shows a single-lip drill according to the invention.

FIG. 4 shows an embodiment of a single-lip drill according to the invention. In this view, the rake face 23 can be seen from above. A plurality of chip-forming devices 33 are introduced in the cutting face 23 in succession and at a distance from one another in the axial direction. The chip-forming devices 33 can be introduced into the rake face 23 by means of grinding, eroding or ablation using a laser beam or another suitable method. Ultimately, the choice of method depends on the technological and geometric limiting conditions. For example, large grinding wheels cannot enter the rake face 23, in the rear region of the rake face 23 where the rake face 23 is delimited by the wall 25. Therefore, small grinding wheels or grinding pins have to be used. This results in certain restrictions in the geometry of the chip-forming devices and the depressions. It is therefore sometimes necessary to introduce the chip-forming devices 33 by means of erosion or ablation using a laser beam. Using this method, almost all desired shapes of chip-forming devices 33 or depressions 37 (see FIGS. 9 and 11) can be introduced into the rake face 23.

Ultimately, the required geometry of the chip-forming devices or the depressions is pivotal for the choice of the manufacturing process.

As can be clearly seen from FIG. 4, the chip-forming device 33.1 directly adjoins the outer cutting edge 17.2; or forms the cutting edge 17.2 together with the flank. The rake face 23 is no longer between the chip-forming device 33.1 and the outer cutting edge 17.2.

When the cutting edges 17.1 and/or 17.2 are worn, there is the option, for the deep hole drill 1 according to the invention, of removing the tip of the drill head 5 until the outer cutting edge 17.2 has reached the second chip-forming device 33.2. This readjusting or grinding of the drill tip substantially includes removal in the region of the flank and the adjacent regions of the drill tip. This can be readily achieved, for example, by means of a facet cut on simple grinding devices.

When the drill tip has been readjusted in the manner described, a deep hole drill having a cutting edge 17.2 and a chip-forming device 33.2 is available again, which has the same properties as a deep hole drill supplied by the manufacturer. This process can be carried out a plurality of times in succession until the last chip-forming device 33.n is "used up."

It is obvious that the arrangement according to the invention of a plurality of chip-forming devices 33 or chip depressions 37 (see e.g. FIG. 9) can considerably increase the useful life of the deep hole drill 1 and make regrinding on site significantly easier.

Figure 5A:
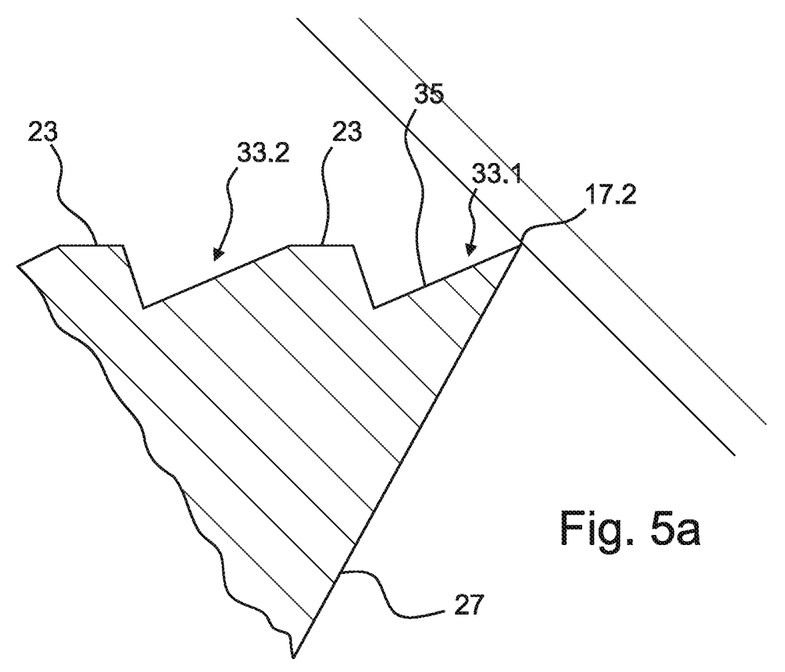
FIGS. 5A and 5B show partial section along line C in FIG. 4.
Figure 5B:
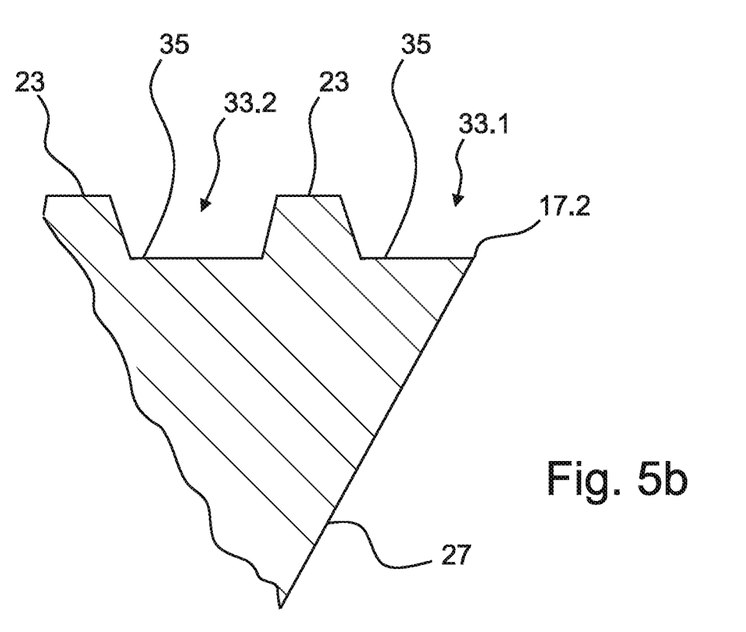

A section through a plane along line C in FIG. 4 is shown in FIGS. 5a and 5b. Exemplary cross sections of a chip-forming device 33 result from this section. In the example shown in FIG. 5a, the cross section of the chip-forming device has the shape of an irregular triangle. The rake angle of the drill is determined by the chip guide surface 35 of the chip-forming device 33. If a different rake angle is desired, then the chip guide surface 35 can be inclined differently according to the desired rake angle when the chip-forming device 33 is introduced.

FIG. 5b shows another exemplary embodiment of the chip-forming device 33, which has the shape of a trapezoid in cross section. In this example the rake angle is 0°. In the context of the invention, it is also important that the flank 27 and the chip guide surface 35 intersect in both cases and form the outer cutting edge 17.2 there. In the example from FIG. 5a, the cutting edge 17.2 lies at the level of the rake face 23; in the example from FIG. 5b, however, the cutting edge 17.2 lies below the rake face plane.

Figure 6:
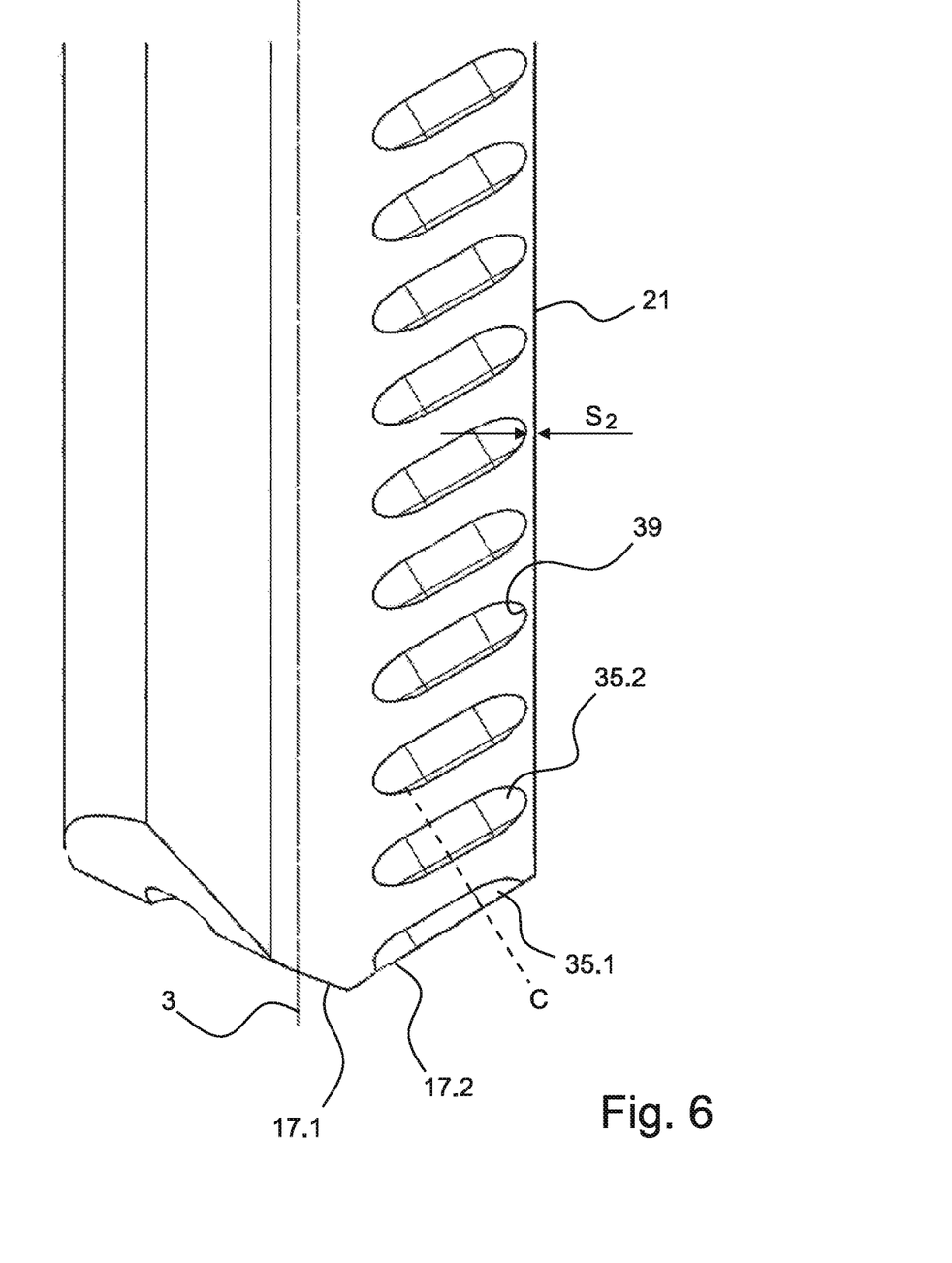
FIG. 6 shows a further single-lip drill according to the invention.

Another embodiment of a chip-forming device according to the invention is shown in FIG. 6. In this embodiment, the chip-forming device is designed in such a way that it does not reach the secondary cutting edge 21. A distance S2 therefore remains between an edge 39 of the chip-forming device 35 and the secondary cutting edge 21. In this embodiment, the outer cutting edge 17.2 is set back until approximately half of the chip-forming device 35 is ground down. This can be seen clearly from the comparison between the first chip-forming device 35.1 and the second chip-forming device 35.2.

Figure 7:
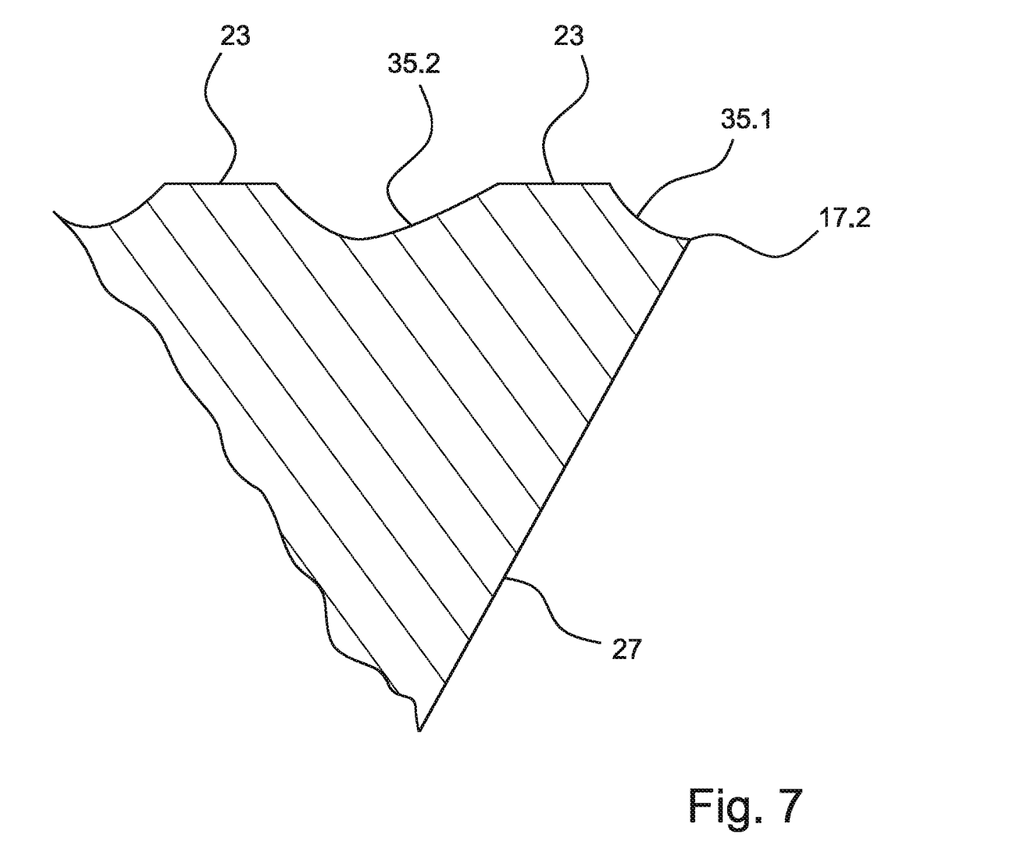
FIG. 7 shows a partial section along line C in FIG. 6.

FIG. 7 shows a section along plane C in FIG. 6. It is clear from this that, firstly, the chip-forming device 35 in this embodiment has an approximately circular arc-shaped cross section and the outer cutting edge 17.2 is not located at the level of the rake face 23, but is arranged somewhat lower.

Figure 8:
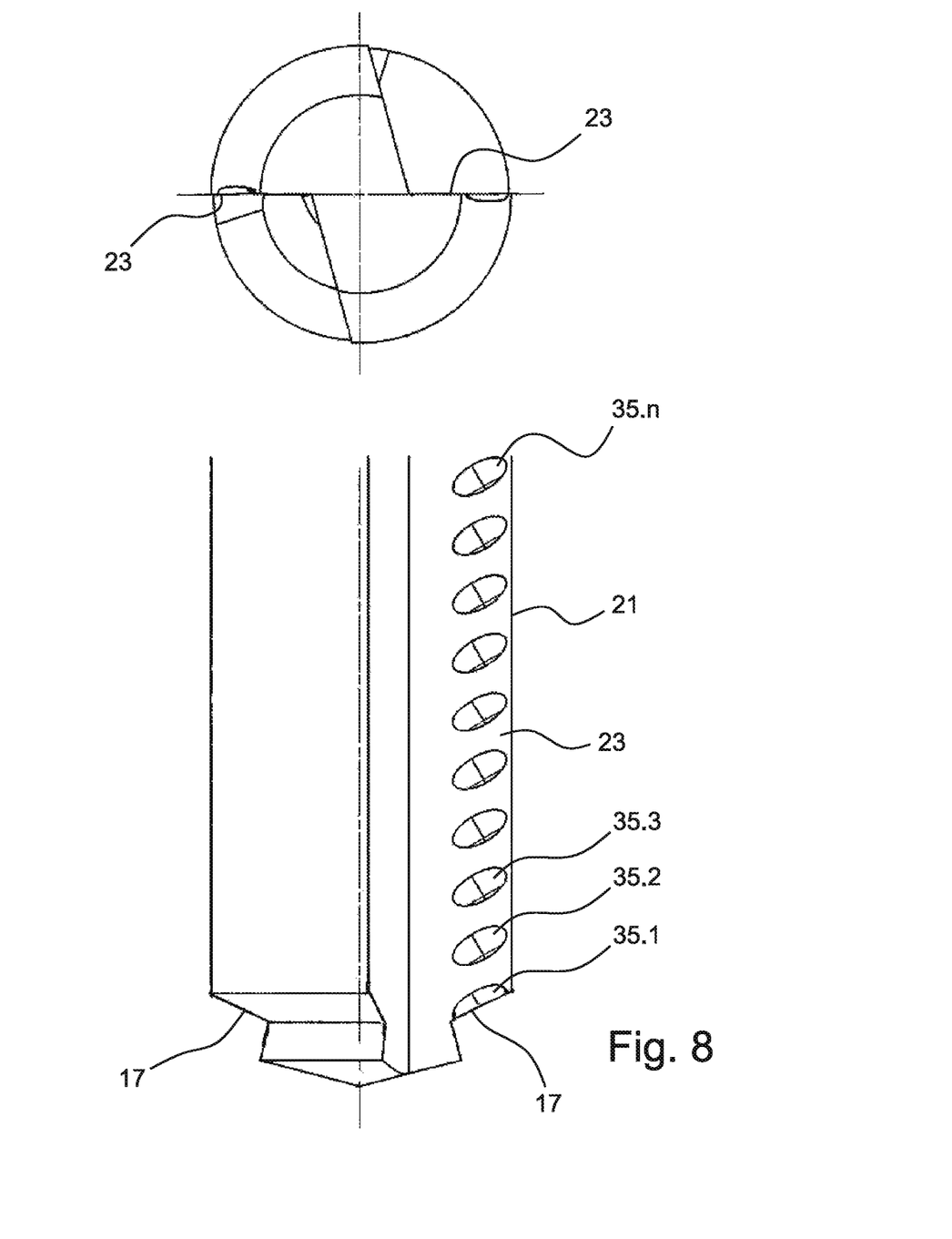
FIG. 8 shows a double-lip drill according to the invention.

FIG. 8 shows an embodiment of a double-lip drill according to the invention. In this case, the chip-forming devices 35 are also arranged as in the embodiment according to FIG. 6.

This tool has two cutting edges 17. In the front view, both rake faces 23 and the associated chip-forming devices 35 can be seen. In this case, part of the first chip-forming device 35.1 was also ground away. All the embodiments of chip-forming devices 33, 35 and depressions 37 shown in the context of single-lip drills can be used for two-lip drills and vice versa.

Figure 9:
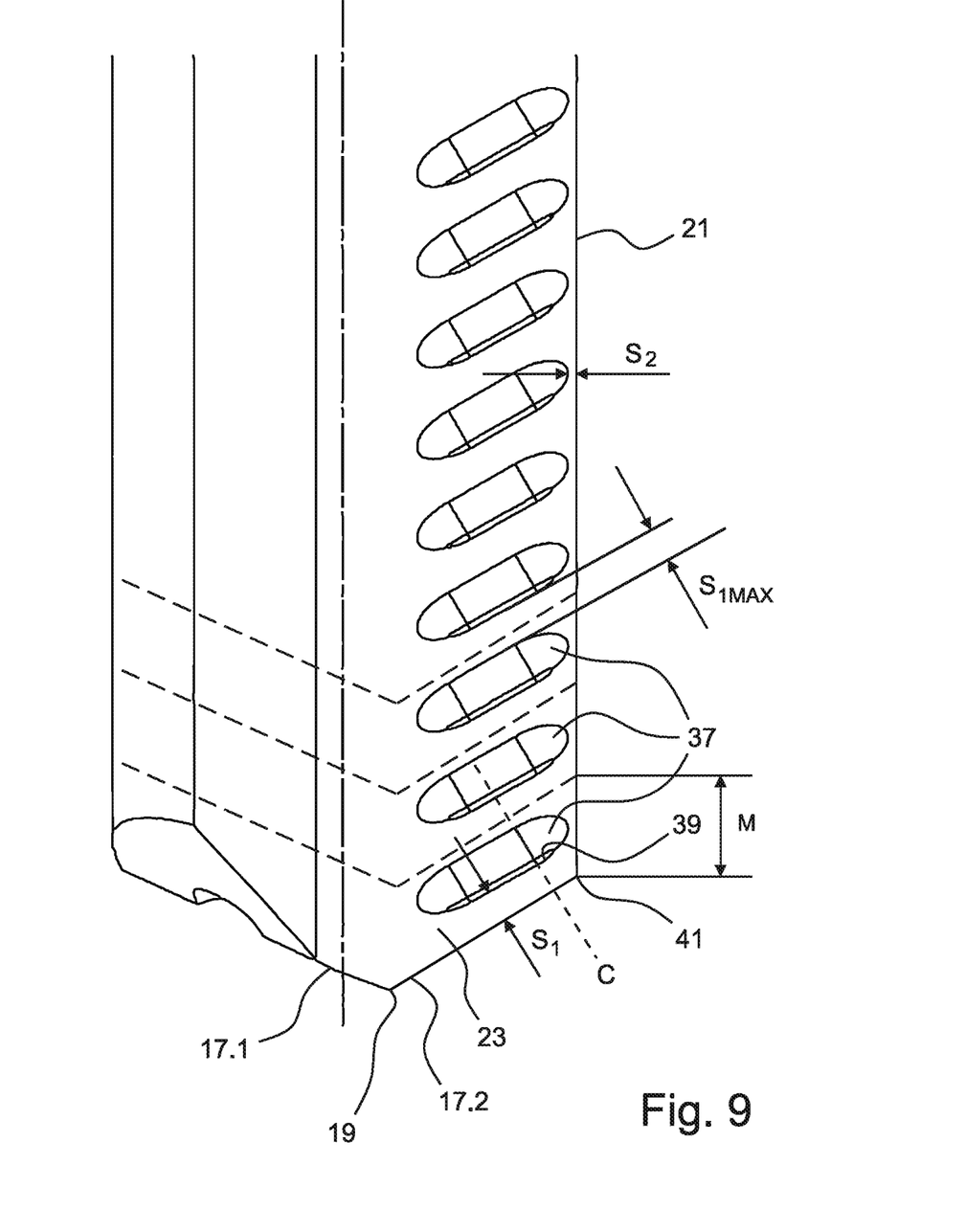
FIG. 9 shows a further single-lip drill according to the invention.

FIG. 9 shows a further embodiment of a deep hole drill according to the invention, in which depressions 37 according to the invention have been introduced into the rake face 23. There is a distance S1 between the cutting edge 17 and the edge 39 of the depression 37. As a result, at least a narrow strip of the rake face 23 remains between the depression 37 and the outer cutting edge 17.2. This narrow strip stabilizes the cutting edge 17.2 and thus increases the service life of the outer cutting edge 17.2. Despite this distance S1, the depression 37 located behind the cutting edge 17.2 influences the chips sliding over it (not shown). These depressions 37 deform or influence the chip in such a way that the short chips desired during deep drilling are produced.

Between an edge 39 of the depressions 37 shown by way of example in FIG. 9, there is a distance S2 from the secondary cutting edge 21, such that the secondary cutting edge 21 is not weakened by the depression 37. The same also applies to chip-forming devices according to the invention (see e.g. FIGS. 6 and 8). This has a particularly positive effect on the cutting corner 41, which, unlike when using chip-forming devices according to FIG. 4, is not weakened by the depressions 37.

Figure 11:
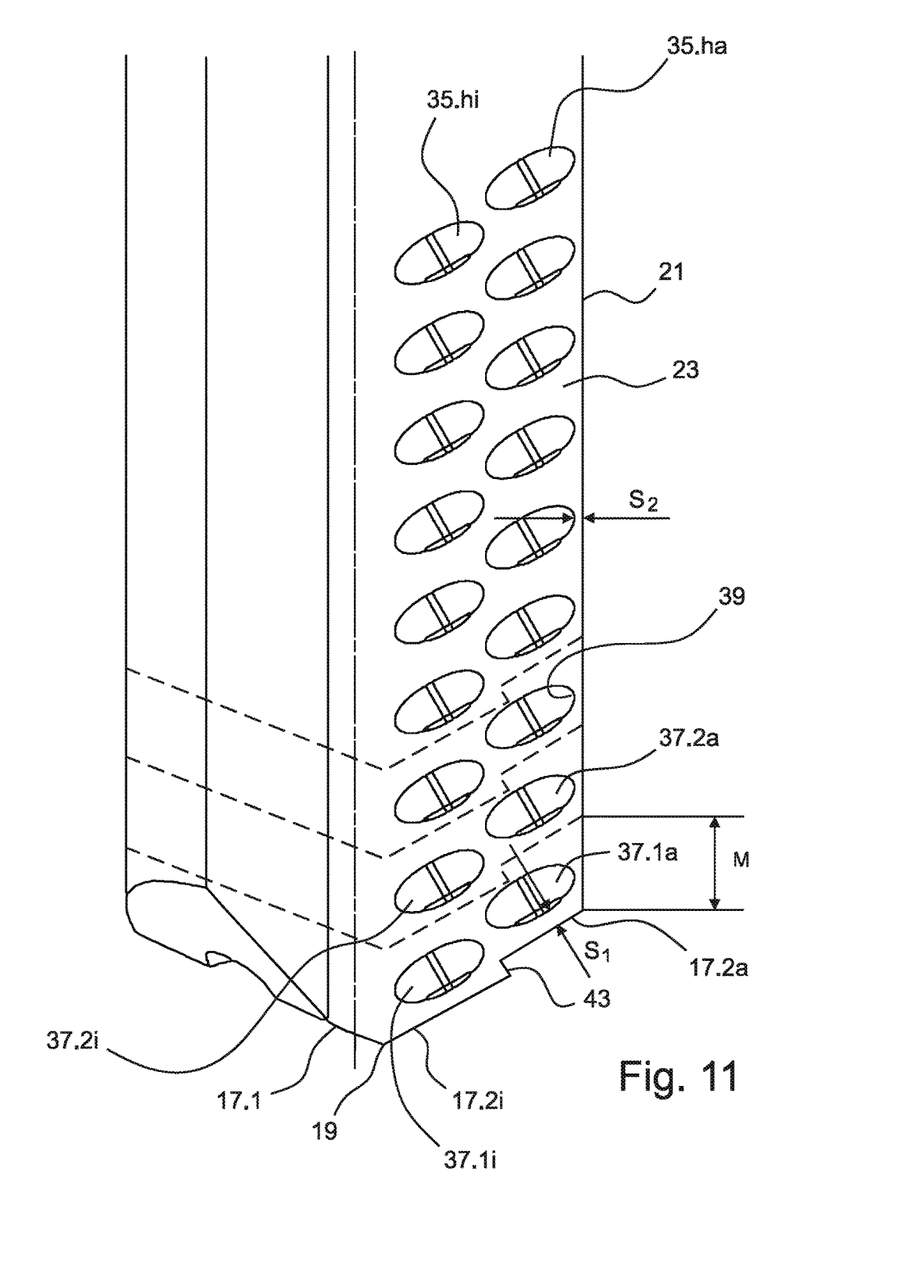
FIG. 11 shows a further single-lip drill according to the invention having chip dividers and depressions.

In order to illustrate the "readjustment," which has already been mentioned multiple times, of the cutting tip of a blunt drill according to the invention, FIGS. 9 and 11 indicate, as an example of the other embodiments, the position of the cutting edge 17 when this has been reground once, twice or three times, by means of a broken line. From these illustrations it is clear that the cutting edge geometry according to the invention of a drill that has become blunt is restored when the drill tip 19, the inner cutting edge 17.1 and the outer cutting edge 17.2 have been ground or "readjusted" by the dimension "M".

Figure 10:
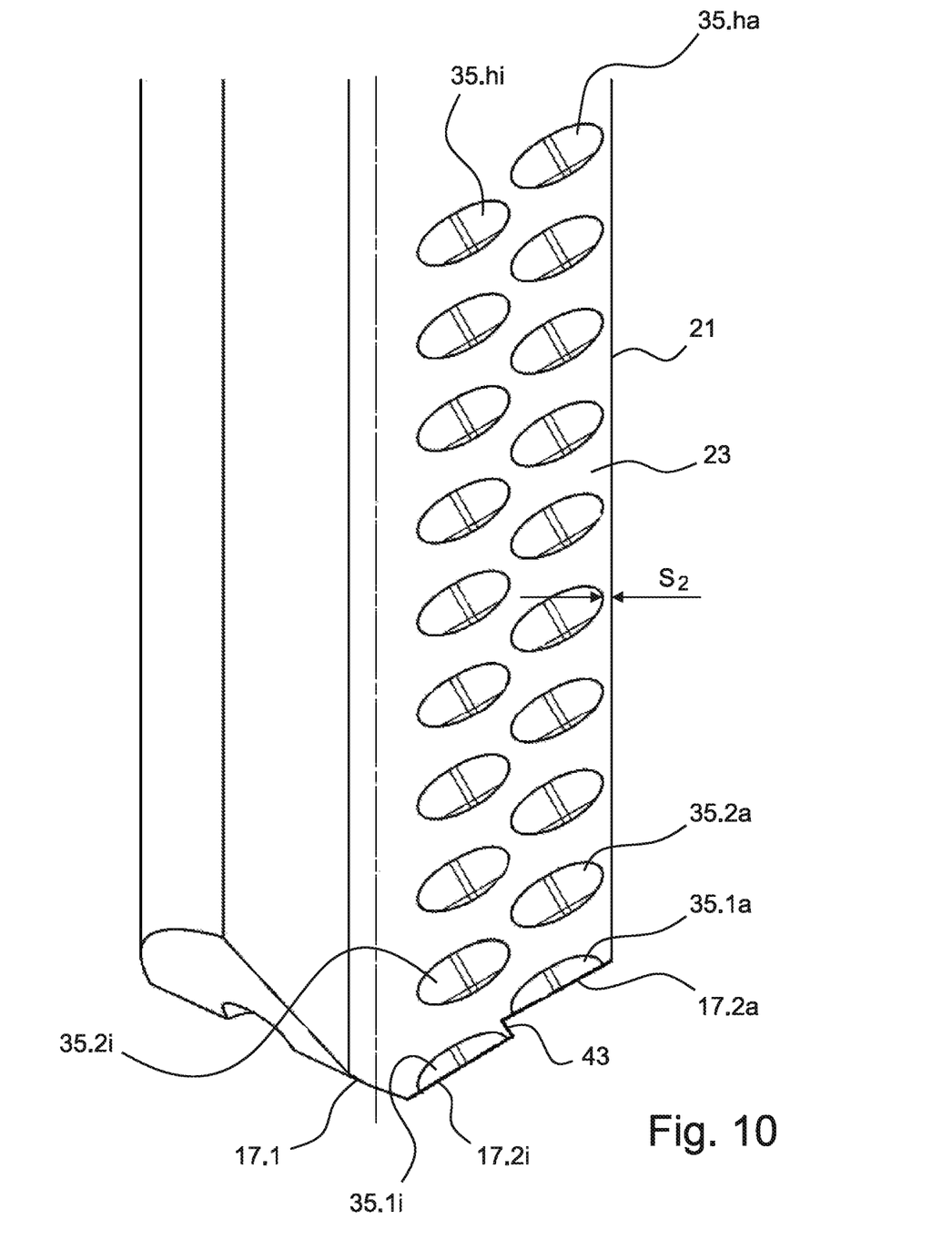
FIG. 10 shows a further single-lip drill according to the invention having chip dividers and chip-forming devices.

FIG. 10 shows a further embodiment of a deep hole drill according to the invention. In the case of this deep hole drill, the outer cutting edge 17.2 is divided into two by a chip divider 43 (see reference signs 17.2*i* and 17.2*a*).

Accordingly, two rows of chip-forming devices 35.1*i* to 35.*ni* and 35.1*a* to 35.*na* are present in the rake face 23 in this embodiment. It is also possible for a row of chip-forming devices 35.1*i* to 35.*ni* or 35.1*a* to 35.*na* to be assigned to only one outer cutting edge 17.2*i* or 17.2*a* (not shown).

It is also possible, in the case of a deep-hole drill having an outer cutting edge 17.2 (see reference signs 17.2*i* and 17.2*a*) divided in two by a chip divider 43, for one or two rows of depressions 37.1*i* to 37.*ni* or 37.1*a* to 37.*na* to be assigned. FIG. 11 shows such a deep hole drill having two rows of depressions by way of example.

As long as the distance S1 between the edge 39 and the cutting edge 17.2 is greater than zero, it is a depression 37. As soon as the distance S1 is equal to or less than zero, it is, by definition, a chip-forming device 33, 35. Then the rake angle can be less than zero, equal to zero or greater than zero, depending on the relative position of the cutting edge 17.2 and chip-forming device 33, 35.

Setting the outer cutting edge 17.2 back even further results in positive rake angles. The rake angle then falls back to a value equal to zero. This process is repeated with each setback. On the basis of this illustration, it should be made clear that by resetting the drill tip to a greater or lesser extent, it is possible to produce either a depression 37 according to the invention or a chip-forming device having different rake angles.

Another advantage of the drilling tool according to the invention is that any wear protection coating that may be present on the rake face 23.1 and 23.2, the chip-forming devices 33, 35 and the depressions 37 as well as the circular grinding chamfer 29 and the guide pads 31 is maintained when the drill is reground.

In the following, some terms are briefly explained and defined.

The overall shape of all cutting and non-rake faces on the end face of the drill head is referred to as the nose grind. This also includes surfaces that do not directly adjoin the cutting edges, for example surfaces for directing the coolant flow or additional flanks to allow the drill to cut cleanly. The nose grind determines the shaping of the chips to a large extent and is matched to the material to be machined. The aims of the matching are, among other things, shaping chips that are as favorable as possible, a high machining speed, the longest possible service life of the drill, and compliance with the required quality characteristics of the bore such as diameter, surface or straightness (centerline).

To increase the service life, the drill head can be provided with a coating as wear protection, mostly from the group consisting of metal nitrides or metal oxides; the coating can also be provided in a plurality of alternating layers. The thickness is usually approx. 0.0005 to 0.010 mm. The coating is carried out by means of chemical or physical vacuum coating processes. The coating can be provided on the circumference of the drill head, on the flanks or on the rake faces, and in some cases the entire drill head can also be coated.

Single-lip drills and double-lip drills are variants of deep hole drills. Deep hole drills are understood to mean tools that work according to various known deep hole drilling systems (for example BTA, ejector drilling, single-lip or double-lip deep hole drilling).

Single-lip drills and double-lip drills are long and slender and have a central axis. The rake face thereof is planar; hence they are also referred to as "straight grooved" tools. They are used to create bores that have a large length to diameter ratio. They are mainly used in industrial metalworking, such as in the production of engine components, in particular in the production of common rails or gear shafts.

Single-lip drills are usually used in a diameter range of approx. 0.5 to 50 mm. Bores having a length of up to about 6,000 mm are possible.

The length to diameter ratio (L/D) of the bore is usually in a range from approx. 10 to over 100; however, it can also be approx. 5 and up to about 250.

Single-lip drills are characterized by the fact that a high-quality bore can be produced in one stroke. They can be used in machine tools such as lathes, machining centers or special deep drilling machines.

The machining process takes place by means of a relative movement of the drill to the workpiece in the direction of rotation about a common central axis, and a relative movement of the drill towards the workpiece in the direction of the common central axis (feed movement). The rotational movement can be caused by means of the drill and/or the workpiece. The same applies to the feed movement.

The flank is the surface at the tip of the drill head that is opposite the machined workpiece surface.

Guide pads are arranged on the circumference of the drill head to support the cutting forces in the drilled bore which arise during cutting. Guide pads are cylinder segments having the diameter of the drill head; they abut the wall of the bore during the drilling process. Radially recessed segments having a smaller diameter are arranged on the drill head, between the guide pads in the circumferential direction, such that a gap is formed between the bore wall and the drill head. The gap is used to collect coolant for cooling and lubricating the guide pads.

There are different arrangements of guide pads; the design depends on the material to be machined. The first guide pad, which adjoins the rake face counter to the direction of rotation of the drill, is referred to as the circular grinding chamfer.

Coolant or a mixture of coolant and air (minimum quantity lubrication) is conveyed through the cooling channel to lubricate and cool the drill head and the guide pads as well as to flush out the chips. Coolant is supplied under pressure to the rear end, passes through the cooling channel and exits at the drill head. The pressure depends on the diameter and length of the drill.

By adapting the pressure of the coolant, single-lip drills and double-lip drills can drill very small and very deep bores in one go.

During the drilling process, the deviation [mm] of the actual bore path from the theoretical central axis of the drill is considered to be the mismatch of axes. The mismatch of axes is an aspect of the bore quality. The aim is to achieve the smallest possible mismatch of axes. In the ideal case, there is no mismatch of axes at all.

The mismatch of axes depends, among other things, on whether the rotational movement is carried out by the drill or the workpiece or both. Experience shows that the smallest mismatch-of-axes values are achieved when the rotational movement is carried out by the workpiece or by the workpiece and the drill.

A depression is a recess machined into the rake face. In contrast to a chip-forming device, the depression does not directly adjoin the cutting edge. The same applies in many cases to the secondary cutting edge, as well. In other words: A narrow strip of the rake face remains between the (main) cutting edge and the secondary cutting edge.

A single-lip drill or double-lip drill which has become dull can be used again by means of regrinding. Regrinding means readjusting/grinding the worn part of the drill head mostly on the end face until all worn regions (in particular of the rake face and flank) have been removed and a new, sharp cutting edge has been formed. The nose grind then reverts to its original shape.

The line of contact (edge) between the rake face and the circular grinding chamfer is referred to as the secondary cutting edge. The point of intersection between the outer cutting edge and the secondary cutting edge is referred to as the cutting corner.

The drill head has at least one cutting edge; there can also be a plurality of cutting edges. The cutting edge is the region that is involved in the machining. The cutting edge is the line of intersection of the rake face and the flank. The cutting edge is usually divided into a plurality of straight partial cutting edges.

The rake face is the region at which the chip is discharged; it can also consist of a plurality of partial surfaces.

A chip-forming device is a recess machined into the rake face, extending parallel to the cutting edge and directly adjoining the cutting edge. In other words: There is no rake face between the cutting edge and the chip-forming device.

A chip divider constitutes a "break" in the outer cutting edge, which reduces the width of the chips.

What is claimed is:

1. Deep hole drill comprising a drill head, the drill head having an axis of rotation, a drilling diameter (D), and one or two cutting edges, a planar rake face being assigned to each cutting edge, and the deep hole drill having one or two secondary cutting edges, characterized in that in each planar rake face a plurality of chip-forming devices and/or a plurality of depressions are arranged in spaced intervals along the central axis, wherein the chip-forming devices and/or the depressions in a sectional plane (C) which extends orthogonally to the one or two cutting edges have the shape of an isosceles or uneven triangle.

2. Deep hole drill according to claim 1, characterized in that the deep hole drill is a single-lip drill having a rake face.

3. Deep hole drill according to claim 1, characterized in that it has at least one guide pad.

4. Deep hole drill according to claim 1, characterized in that the drill head, before being reground for the first time, is completely or partially provided with a hard material coating.

5. Method for producing a deep hole drill according to claim 1, comprising the following steps:
   producing a drill head having one or two rake faces by introducing a plurality of chip-forming devices and/or depressions into at least one rake face by grinding, eroding or ablating by means of a laser beam.

6. Method according to claim 5, characterized in that at least part of the surface of the drill head is provided with a functional coating.

* * * * *